United States Patent [19]

Sato et al.

[11] Patent Number: 5,593,802
[45] Date of Patent: Jan. 14, 1997

[54] METHOD OF FORMING A SPACER FOR USE IN A LIQUID CRYSTAL PANEL

[75] Inventors: Morimasa Sato; Fumiaki Shinozaki, both of Shizuoka, Japan

[73] Assignee: Fuji Photo Film Co., Ltd., Kanagawa, Japan

[21] Appl. No.: 319,567

[22] Filed: Oct. 7, 1994

[30] Foreign Application Priority Data

Oct. 7, 1993 [JP] Japan .................................. 5-251777

[51] Int. Cl.$^6$ .............................. C09K 19/00; G02F 1/13
[52] U.S. Cl. ........................... 430/20; 430/258; 430/320; 349/155
[58] Field of Search .................... 430/20, 7, 320, 430/258; 359/75, 81, 82

[56] References Cited

U.S. PATENT DOCUMENTS

| 5,130,831 | 7/1992 | Kohara et al. | 430/20 |
| 5,338,240 | 8/1994 | Kim | 430/20 |
| 5,397,678 | 3/1995 | Sato et al. | 430/258 |

FOREIGN PATENT DOCUMENTS

| 58-156920 | 9/1983 | Japan | 430/20 |
| 61-173221 | 8/1986 | Japan | 430/20 |

*Primary Examiner*—John S. Y. Chu
*Attorney, Agent, or Firm*—Sughrue, Mion, Zinn, Macpeak & Seas

[57] ABSTRACT

A method of forming a spacer for supporting two substrates which constitute a liquid crystal panel, wherein the spacer is disposed between the two substrates, at least one of which has thereon an alignment layer which has been subjected to aligning treatment, comprising the steps of: (1) laminating the substrate having the alignment layer on a transfer sheet comprising projections of substantially uniform thickness on a temporary support in such a manner that the projections closely contact the alignment layer, and (2) peeling-off the temporary support to transfer the projections onto the alignment layer. The inventive method forms a spacer through a simple step and at a uniform density, and prevents damage of an aligning layer.

6 Claims, No Drawings

METHOD OF FORMING A SPACER FOR USE IN A LIQUID CRYSTAL PANEL

FIELD OF THE INVENTION

The present invention relates to a method of forming a spacer for use in a liquid crystal panel. The spacer is disposed between two substrates constituting the liquid crystal panel and supports both substrates.

BACKGROUND OF THE INVENTION

A liquid crystal panel is formed by oppositely disposing (1) a lower substrate having an aligning layer, a picture element electrode, a thin layer transistor, an MTM forming element and matrix wiring, and (2) an upper substrate having an alignment layer, an electrode and a color filter, with a liquid crystal inserted between the lower and upper substrates. In order to define the thickness of the liquid crystal layer, a method which comprises dispersing transparent cylindrical or granular fine spacers on either of the substrates (or on both substrates in some cases) is known in the art. The substrates are then assembled to interpose the spacers therebetween. A conventional method of forming a spacer is to scatter glass beads or the like. In this method, however, it is difficult to uniformly scatter the spacers. This results in a difference in spacer density within the plane, to produce irregular gaps between the substrate and cause uneven displays.

JP-A-3-89320 (the term "JP-A" as used herein means an unexamined published Japanese patent application) and JP-A-5-11256 disclose methods of forming a spacer in a desired place by a photolithography process using a photopolymerizable resin. However, these methods can damage the alignment layer during formation of the photopolymerizable resin layer and during the photolithographic step at which a spacer contacts the aligning layer.

JP-A-2-210329 discloses a method in which a photopolymer shut is laminated on a substrate provided with an alignment layer, the photopolymer sheet is imagewise exposed and developed to form spacer dots and then an aligning treatment is carried out.

However, this known method has caused some problems, that is, (1) since the spacer dots are formed on a liquid crystal substrate, incomplete formation of the spacer dots makes the whole liquid crystal substrate unusable and results in the reduction of yield of the liquid crystal substrate itself and (2) since an aligning treatment is carried out after the formation of the spacer dots, the spacer dots formed fall out during the aligning treatment and the aligning treatment cannot sufficiently be carried out around the spacer dots in the alignment layer. In the prior art a photoresist layer is directly coated onto the substrate or alignment layer, whereas in the present invention the photoresist is coated onto a temporary support. In the prior art, the coated alignment layer is subjected to exposure and development, whereas in the method of the present invention all photolithography operations are carried out using the coated temporary support.

SUMMARY OF THE INVENTION

Therefore, it is an object of the present invention to provide a method of forming a spacer through a simple step in which (1) the yield of a liquid crystal substrate is increased, and (2) there is no danger of damaging the alignment layer.

The above object of the present invention has been attained by the method of forming a spacer for supporting two substrates which constitute a liquid crystal panel, wherein the spacer is disposed between the two substrates, at least one of which has thereon an alignment layer which has been subjected to aligning treatment, comprising the steps of:

(1) laminating the substrate having the alignment layer on a transfer sheet comprising projections of substantially uniform thickness on a temporary support in such a manner that the projections closely contact the alignment layer, and (2) peeling-off the temporary support to transfer the projections onto the alignment layer.

DETAILED DESCRIPTION OF THE INVENTION

The present invention is explained in greater detail below.

Various known materials for the substrate which constitute the liquid crystal panels are used in the present invention, and specific examples thereof include a glass substrate and a plastic substrate.

Various known materials for the aligning layers are used for the alignment layers used in the present invention, and specific examples thereof include polyimide materials.

Various known methods for aligning treatment are used in the present invention and specifically they include a rubbing method.

A transfer sheet for use in the present invention having projections with a substantially uniform thickness (height) on a temporary support can be prepared by various methods including a printing process to print projections on a temporary substrate, an electrodeposition process to deposit projections on a patterned conductive layer formed on a temporary support, and a photolithographic process using a photopolymer.

Preferred among these processes is a photolithographic process for forming projections using a light-sensitive sheet comprising a photopolymerizable resin layer provided on a temporary support.

A flexible synthetic resin film can be used as the temporary support of the light-sensitive sheet material. Of the flexible synthetic resin films polyethylene terephthalate film having a thickness of from 20 to 200 µm is particularly preferred. The temporary support is preferably subjected to antistatic treatment to prevent the generation of static electricity when the temporary support is peeled-off. For this purpose, the various materials described in JP-A-5-173320, which corresponds to U.S. Pat. No. 5,397,678, and the publications cited therein (i.e., U.S. Pat. Nos. 2,698,235, 3,143,421, 3,567,452, 3,586,508, 3,615,556, 4,069,192 and 4,080,353, JP-A-48-24923, JP-A-50-39516, JP-A-51-58469, JP-A-51-114120, JP-A-51-135526, JP-A-56-82504, JP-A-56-143430, JP-A-56-143443, JP-A-57-104931, JP-A-57-118242, JP-A-58-62647 and JP-A-60-258541) can be used.

The various photopolymerizable compositions described in JP-B-56-40824 (the term "JP-B" as used herein means an examined Japanese patent publication), JP-A-4-115202 and the publications cited therein (i.e., JP-A-2-82262 and JP-A-2-161055) can be used as the photopolymerizable resin layer. The thickness of the photopolymerizable resin layer is selected to be equal to the final desired thickness of the spacer, with 0.5 to 15 µm being preferred, 2 to 10 µm particularly preferred.

A coloring agent such as a pigment may be incorporated into the photopolymerizable resin layer, as desired, in order to prevent light scattering (in the liquid crystal panel) due to the spacer. Examples of useful coloring agents include those described in JP-A-5-173320, which corresponds to U.S. Pat. No. 5,397,678, and the publications cited therein (i.e., JP-A-2-82262). Coloring agents which provide black or nearly black tones are preferred, particularly for preventing light scattering. Examples of such coloring agents include a pigment such as carbon black and mixtures of plural pigments as described in Japanese Patent Application No. Hei. 5-110487. Preferably, the coloring agents are incorporated in such amount that the projections have an optical density in a visible region of from 1 to 3.

The oxygen-intercepting water soluble resin layer described in JP-B-56-40824 may be provided on the photopolymerizable resin layer to prevent a reduction in sensitivity to photopolymerization. A cover film having a thickness of from 2 to 100 μm also may be provided on the photopolymerizable resin layer and/or the water soluble resin layer for protection and oxygen interception. Furthermore, a subbing layer may be provided between the temporary support and the photopolymerizable resin layer.

Pattern exposure and development in the present invention can be conducted by known methods including those described, for example, in JP-A-5-173320, which corresponds to U.S. Pat. No. 5,397,678, and the publications cited therein (i.e., JP-A-2-82262).

The transfer sheet having projections with a substantially uniform thickness, having a variation of not more than ±10%, preferably not more than ±5%, provided on a temporary support is prepared by pattern-exposing and developing the above described light-sensitive sheet prepared by the photolithographic process. Preferably, the projections are in the form of a pillar having a thickness (height) of from 0.5 to 15 μm and a sectional area of from about 0.8 to 700 μm² at any plane parallel to the temporary support. When the sectional area of the projections is less than 0.8 μm² or exceeds 700 μm² the display quality deteriorates.

In practice, it is preferred to provide at equal intervals (pitch) a pillar having a highly symmetric section such as a cylindrical form having a diameter of from about 1 to 30 μm, a prism form having sides that are all about 0.9 to 26 μm long, or a pillar having an oval cross section and a sectional area of from about 0.8 to 700 μm².

The projection pitch is generally 10 to $10^5$ μm, preferably 10 to $10^4$ μm.

The pattern is preferably formed so that the number of projections is not more than 5 per picture element when the projections are provided on the R (red), G (green) and B (blue) picture elements. A number of projections exceeding 5 per picture element results in deterioration of display quality. When the projections are provided only on a black matrix (BM) region, the number of projections is determined within a range such that the total area of the projections does not exceed the area of the BM region.

The side of the temporary substrate having projections provided thereon is laminated onto a lower substrate having an alignment layer, a picture element electrode, a thin layer transistor, an MTM forming element and matrix wiring or onto an upper substrate having an alignment layer, an electrode and a color filter. The temporary support is then peeled-off to transfer the projections to the lower or upper substrate. The transferred projections function as a spacer upon assembly of the liquid crystal panel. Therefore, unlike conventional methods, the present invention prevents an inplane difference in spacer density. Also, in the present invention, the upper or lower substrate is not subjected to a photolithographic process and the alignment layer and other elements are not subject to damage. It is also possible to form the projections in the BM region alone by aligning the temporary support with the substrate when they are laminated to each other. In the present invention the surface of the temporary support having the projections contacts the substrate when the projections are transferred to the substrate. However, the areas of the temporary support where projections are not provided are held apart from the surface of the substrate by the thickness (or height) of the projections and therefore do not contact the surface of the substrate. Thus, the transfer process in the present invention does not damage the aligning layer and other elements of the substrate.

The loss of the liquid crystal substrate can be minimized and the yield is increased by inspecting the state of the formation of the projections on the temporary support and using acceptable substrates only.

The components and structure of a typical liquid crystal panel for use in the present invention are described in JP-A-3-89320.

The present invention is explained in greater detail in the Examples below, however, the present invention should not be construed as being limited thereto. Unless otherwise indicated, all parts, percents and the like are by weight.

EXAMPLE 1

By reference to JP-A-3-89320, a lower substrate was prepared, comprising a gate electrode, a picture element electrode, a source electrode, an insulation layer, a drain electrode, a passivation layer and alignment layer each provided on a glass substrate. Thereafter, the alignment layer was rubbed to carry out an aligning treatment.

A light-sensitive sheet material having the following constitution was prepared:

A photopolymerizable resin solution of the following Composition 1 was coated on a temporary support of a polyethylene terephthalate film 75 μm thick in such amount that the dry thickness of the photopolymerizable resin layer was 7 μm.

| Composition 1 | |
|---|---|
| Copolymer of benzyl methacrylate and methacrylic acid (molar ratio: 73/27, viscosity: 0.12 in MEK at 25° C.) | 60 g |
| Pentaerythritol tetracrylate | 50 g |
| Michler's ketone (($Me_2NC_6H_4$)$_2$CO) | 2.4 g |
| Lophine dimer | 2.5 g |
| Methyl Cellosolve acetate (2-methoxyethyl acetate) | 560 g |
| Methyl ethyl ketone | 280 g |

Further, an aqueous poly(vinyl alcohol) (PVA 205 manufactured by Kuraray Co., Ltd.) was coated on the photopolymerizable resin layer in such amount that the dry thickness of the poly(vinyl alcohol) layer was 1.5 μm, to form an oxygen-intercepting layer.

A spacer was formed using the light-sensitive sheet material in the following manner:

A mask having light-transmittable and circular dot-shaped portions of 10 μm diameter and 50 μm pitch was placed on the oxygen-intercepting poly(vinyl alcohol) layer. The light-sensitive sheet material was exposed through the mask and then developed in an aqueous alkali of pH 10.8 to thereby remove the unexposed portions. As a result, a pattern 7 μm thick was formed in the form of cylindrical dots of 10 μm diameter and 50 μm pitch on the temporary support.

Thereafter, the temporary support having thereon the dots was laminated onto the lower substrate so that the dots contacted the alignment layer of the lower substrate, using a type VP-II laminator (manufactured by Taisei Laminator Co., Ltd.) at a heating temperature of 110° C., a roller pressure of 2 kg/cm$^2$ and a transporting speed of 0.3 m/min.

The temporary support was then peeled-off to transfer only the dots onto the lower substrate. A spacer in the form of cylindrical dots having a thickness of 7 μm, a diameter of 10 μm and a pitch of 50 μm was thus formed on the alignment layer of the lower substrate.

The spacer thus prepared advantageously had a high precision spacer distance and good strength, and did not damage the alignment layer.

EXAMPLE 2

A light-sensitive sheet material was prepared in the same manner as Example 1, except that an oxygen-intercepting poly(vinyl alcohol) layer was not formed and a polypropylene film 12 μm thick was laminated onto the photopolymerizable resin layer. The light-sensitive sheet material was exposed in the same manner as Example 1 from the side of the polypropylene film. Thereafter the polypropylene film was peeled-off. Development was performed in the same manner as in Example 1 to form a pattern in the form of dots having a thickness of 7 μm, a diameter of 10 μm and a pitch of 50 μm.

A spacer was formed on a liquid crystal display substrate by the same process described in Example 1. The spacer thus formed was excellent, like that of Example 1, in that it had a high precision spacer distance and a good strength, and did not damage the alignment layer.

EXAMPLE 3

A spacer was formed on a liquid crystal display substrate in the same manner as in Example 2, except that exposure and development were performed after the polypropylene film of Example 2 was peeled-off. In this case, because the sensitivity of the photopolymerizable resin layer had been reduced, on exposure energy 10 times that used in Example 2 was used for exposure. The spacer thus formed was excellent, like that of Example 1, in that it had a high precision in spacer distance as a spacer and good strength, and did not damage the alignment layer.

EXAMPLE 4

A spacer was formed on a liquid crystal substrate in the same manner as in Example 1, except for using a coating solution of the following Composition 2 in place of Composition 1 of Example 1.

| Composition 2 | |
|---|---|
| Copolymer of benzyl methacrylate and methacrylic acid (molar ratio: 73/27, viscosity: 0.12 in MEK at 25° C.) | 60 g |
| Pentaerythritol tetracrylate | 50 g |
| Michler's ketone ((Me$_2$NC$_6$H$_4$)$_2$CO) | 2.4 g |
| Lophine dimer | 2.5 g |
| Carbon black | 10.0 g |
| Methyl Cellosolve acetate (2-methoxyethyl acetate) | 560 g |
| Methyl ethyl ketone | 280 g |

The black spacer thus formed (optical density 2.5) was excellent, like that of Example 1, in that it had a high precision in spacer distance and good strength, and did not damage the alignment layer.

EXAMPLE 5

A spacer was formed on a liquid crystal substrate in the same manner as in Example 1, except for using a coating solution of the following Composition 3 in place of Composition 1 of Example 1.

| Composition 3 | |
|---|---|
| Copolymer of benzyl methacrylate and methacrylic acid (molar ratio: 73/27, viscosity: 0.12 in MEK at 25° C.) | 60 g |
| Pentaerythritol tetracrylate | 50 g |
| Michler's ketone ((Me$_2$NC$_6$H$_4$)$_2$CO) | 2.4 g |
| Lophine dimer | 2.5 g |
| C.I. Pigment Red 177 | 2.0 g |
| C.I. Pigment Blue 15:6 | 1.5 g |
| C.I. Pigment Yellow 139 | 1.5 g |
| C.I. Pigment Violet 23 | 0.5 g |
| Carbon black | 1.0 g |
| Methyl Cellosolve acetate (2-methoxyethyl acetate) | 560 g |
| Methyl ethyl ketone | 280 g |

The black spacer thus formed was excellent, like that of Example 1, in that it had a high precision in spacer distance and good strength, and did not damage the alignment layer.

In accordance with the present invention, a spacer is formed using a simple method which does not damage the alignment layer and also only non-defective transfer sheets are selected following the step of forming projections on a temporary support. As a result, the yield of the spacers and liquid crystal panels is increased.

While the invention has been described in detail and with reference to specific embodiments thereof, it will be apparent to one skilled in the art that various changes and modifications can be made therein without departing from the spirit and scope thereof.

What is claimed is:

1. A method of forming a spacer for supporting two substrates which constitute a liquid crystal panel, wherein the spacer is disposed between the two substrates, at least one of which has thereon an alignment layer which has been subjected to aligning treatment comprising the steps of:

(1) laminating the substrate having the alignment layer on a transfer sheet comprising projections of a thickness having a variation of not more than ±10% on a temporary support in such a manner that the projections closely contact the alignment layer, and (2) peeling-off the temporary support to transfer the projections onto the alignment layer.

2. A method of forming a spacer for use in a liquid crystal panel of claim 1, wherein the transfer sheet comprising projections of the thickness having a variation of not more than ±10% is formed by the steps of:

(1) patternwise exposing to light a light-sensitive sheet comprising a photopolymerizable resin layer provided on a temporary support, and (2) removing the unexposed portions of the photopolymerizable resin layer to form a pattern of projections on the temporary support.

3. A method of forming a spacer for use in a liquid crystal panel of claim 1, wherein the projections are each in the form of a pillar having a thickness of from 0.5 to 15 μm and a sectional area of from about 0.8 to 700 μm² at any plane parallel to the temporary support.

4. A method of forming a spacer for use in a liquid crystal panel of claim 2, wherein the thickness of the photopolymerizable resin layer is from 0.5 to 15 μm.

5. A method of forming a spacer for use in a liquid crystal panel of claim 1, wherein the projections have an optical density in a visible region of from 1 to 3.

6. A method of forming a spacer for use in a liquid crystal panel of claim 2, wherein the photopolymerizable resin layer has an optical density in a visible region of from 1 to 3.

* * * * *